United States Patent [19]
Sonneland et al.

[11] Patent Number: 6,049,509
[45] Date of Patent: Apr. 11, 2000

[54] METHOD OF PROCESSING SEISMIC DATA TO OBTAIN THE TRAVEL TIME CURVE

[75] Inventors: Lars Sonneland, Sola; Oyvind Yrke, Sandes, both of Norway; Per Ola Tennebo, Ipswich, United Kingdom

[73] Assignee: Geco A.S., Stavanger, Norway

[21] Appl. No.: 08/945,075

[22] PCT Filed: Apr. 29, 1996

[86] PCT No.: PCT/GB96/01018

§ 371 Date: Jan. 26, 1998

§ 102(e) Date: Jan. 26, 1998

[87] PCT Pub. No.: WO96/34301

PCT Pub. Date: Oct. 31, 1996

[30] Foreign Application Priority Data

Apr. 27, 1995 [GB] United Kingdom .................. 9508525

[51] Int. Cl.[7] .................................................. G01V 1/30
[52] U.S. Cl. ................................................. 367/49; 367/73
[58] Field of Search .................. 367/40, 52, 50, 367/51, 73, 49, 21; 340/15.5

[56] References Cited

U.S. PATENT DOCUMENTS

| | | | |
|---|---|---|---|
| 3,651,451 | 3/1972 | Ruehle | 340/15.5 |
| 3,696,331 | 10/1972 | Guinzy et al. | 340/15.5 |
| 4,503,527 | 3/1985 | Pann | 367/53 |
| 4,849,887 | 7/1989 | Skylas | 364/421 |
| 5,050,131 | 9/1991 | Wang et al. | 367/73 |
| 5,153,858 | 10/1992 | Hildebrand | 367/72 |
| 5,414,674 | 5/1995 | Lichman | 367/49 |
| 5,563,949 | 10/1996 | Bahorich et al. | 364/421 |

FOREIGN PATENT DOCUMENTS 0181216  5/1986  European Pat. Off. .

OTHER PUBLICATIONS

Geophysics, vol. 44, No. 7, Jul. 1979, pp. 1193–1207, B. T. May et al, "Higher–order moveout spectra".

*Primary Examiner*—Christine K. Oda
*Assistant Examiner*—Anthony Jolly
*Attorney, Agent, or Firm*—Jacobson, Price, Holman & Stern, PLLC

[57] ABSTRACT

A plurality of seismic traces are arranged in order of increasing of feet and features therein are analyzed so as to identify corresponding features in each of the curves. The travel time to each of the features is derived in order to extract an actual travel time curve as a function of offset.

26 Claims, 5 Drawing Sheets

MASTERPROJECT Zero-offset cube

SUBPROJECT (Multiversions) Offset cubes

METHOD OF PROCESSING SEISMIC DATA TO OBTAIN THE TRAVEL TIME CURVE

The present invention relates to a method of processing seismic data.

Seismic data are collected using an array of seismic sources and seismic receivers. The data may be collected on land using, for example, explosive charges as sources and geophones as receivers; or the data may be collected at sea using, for example, airguns as the sources and hydrophones as the receivers.

After the raw seismic data have been acquired, the reflected signals (known as traces) received by each of the receivers as a result of actuation of a seismic energy source are processed to produce a sub-surface image. The processing includes the steps of transforming (or "migrating") the signals to their actual sub-surface location. The traces are then corrected to account for the separation, known as offset, between the source and the receiver.

FIG. 1 of the accompanying drawings schematically illustrates an idealised source and receiver arrangement arranged along a line. First, second and third sources 2, 4 and 6, respectively, co-operate with first, second and third receivers 8, 10 and 12, respectively. The sources and receivers are arranged about a common mid-point 15. For the sake of simplicity, the stratum or rock 20 beneath the sources and receivers will be assumed to be isotropic and to contain first and second horizontal partial reflectors 22 and 24, respectively. Seismic energy produced from the actuation of the first source 2 is reflected from the partial reflectors 22 and 24 and received by each of the receivers 8, 10 and 12. However, for the sake of simplicity only energy reflected from beneath the common midpoint 15 will be considered herein. Thus, in this example, we only consider energy received at the first receiver 8 as a result of actuation of the first source 2, energy received at the second receiver 10 as a result of actuation of the second source 4, and energy received at the third receiver 12 as a result of actuation of the third source 6. The "round trip" travel time of the energy from a source to a respective receiver increases with increasing distance between the source and the receiver. The round trip travel time is also a function of the depth of the reflectors 22 and 24. FIG. 2 of the accompanying drawings schematically illustrates the travel time for the situation shown in FIG. 1 as the offset increases. The offset axis of FIG. 2 is labelled 1, 2, and 3 to refer to the travel time between the first source and first receiver, the second source and second receiver, and the third source and third receiver, respectively. The round trip travel time with respect to offset for each of the reflectors defines a curve, in this simplified situation the curve can be accurately defined by:

$$t^2(\text{offset}) = (\text{offset})^2/(\text{velocity})^2 + t^2(\text{zero offset})$$

where is the round trip travel time, offset is the distance between the source and the receiver, and velocity is the speed of propagation of the seismic signals within the rock.

During the processing of the seismic survey data, the traces are assigned to their respective common midpoints such that the geology beneath the line of sources and receivers can be probed at a plurality of positions. A velocity analysis is then performed for each common midpoint, and indeed, for each reflector 22 and 24. This is achieved by specifying a range of hyperbolas, as defined in the above equation, related to a range of velocities and computing the mean reflection amplitude along all specified hyperbolas within that range. The seismic traces for a plurality of offsets are then converted, in accordance with the hyperbolas, to equivalent traces having zero offset and the traces are then summed. The mean amplitudes at zero offset are then examined to determine which hyperbola gives the best result.

Once an appropriate hyperbola has been selected, all the seismic data relating to the common midpoint for which the hyperbola has been determined are then corrected for normal moved and stacked so as to provide a stacked trace for that particular common midpoint. The stacked trace has an improved signal to noise ratio compared to the traces recorded at the receivers.

Although this technique is powerful and is used in the processing of seismic data, it is not without its problems. The strata or rocks beneath the receiver and source array are not isotropic. The velocity of sound within the earth tends to increase with depth as the earth layers become more compact. Furthermore, there may be a plurality of earth layers and each may have differing propagation velocities. Thus, the actual round trip travel times will depart from the hyperbolic assumption.

The accuracy of the seismic data processing could be improved if the actual round trip travel times were used as opposed to those fitted to a hyperbolic curve.

According to the present invention there is provided a method of processing seismic data traces assigned to a common reflection point, comprising analysing the seismic data traces to determine similar features therein relating to a reflection of seismic energy from a first reflector, and ordering those features with respect to at least offset so as to identify a travel time surface of the seismic energy reflected from the first reflector.

It is thus possible to define the actual travel time versus offset surface (when travel time is mapped against offset and at least one other variable, for example, position) or curve (when the mapping is performed with respect to offset only) and thereby to extract improved information in respect of the velocity of propagation of seismic signals within the geology beneath a seismic array.

Preferably the traces are summed to form a composite trace having zero offset. Advantageously the seismic array is an array adapted for three dimensional seismic surveying and the traces connected thereby are sorted into an array of cells (or bins) prior to analysis. A more detailed description of the binning process can be found in GB-A-2 247.

The actual round trip travel times with respect to offset may be fitted to a curve so as to define a travel time line. The fitting may also be performed with respect to position of the common reflection point (in one or two dimensions) so as to define a travel time surface within a three or more dimensional space. Preferably, the travel time curve or surface has a higher order than a hyperbolic curve or surface.

Preferably, a velocity model is used to determine the contribution of the seismic traces to the common reflection point.

Preferably, the common reflection point is a common midpoint.

The method may be repeated for reflections from further reflectors. The method may be guided by preexisting survey data or from estimates of the geology of the region. This may reduce the amount of computation performed on the data since the search for similar features will be guided to approximately the right position in a data space and consequently will make fewer unsuccessful analyses.

The present invention will further be described, by way of example, with reference to the accompanying drawings, in which.

Figure 1:
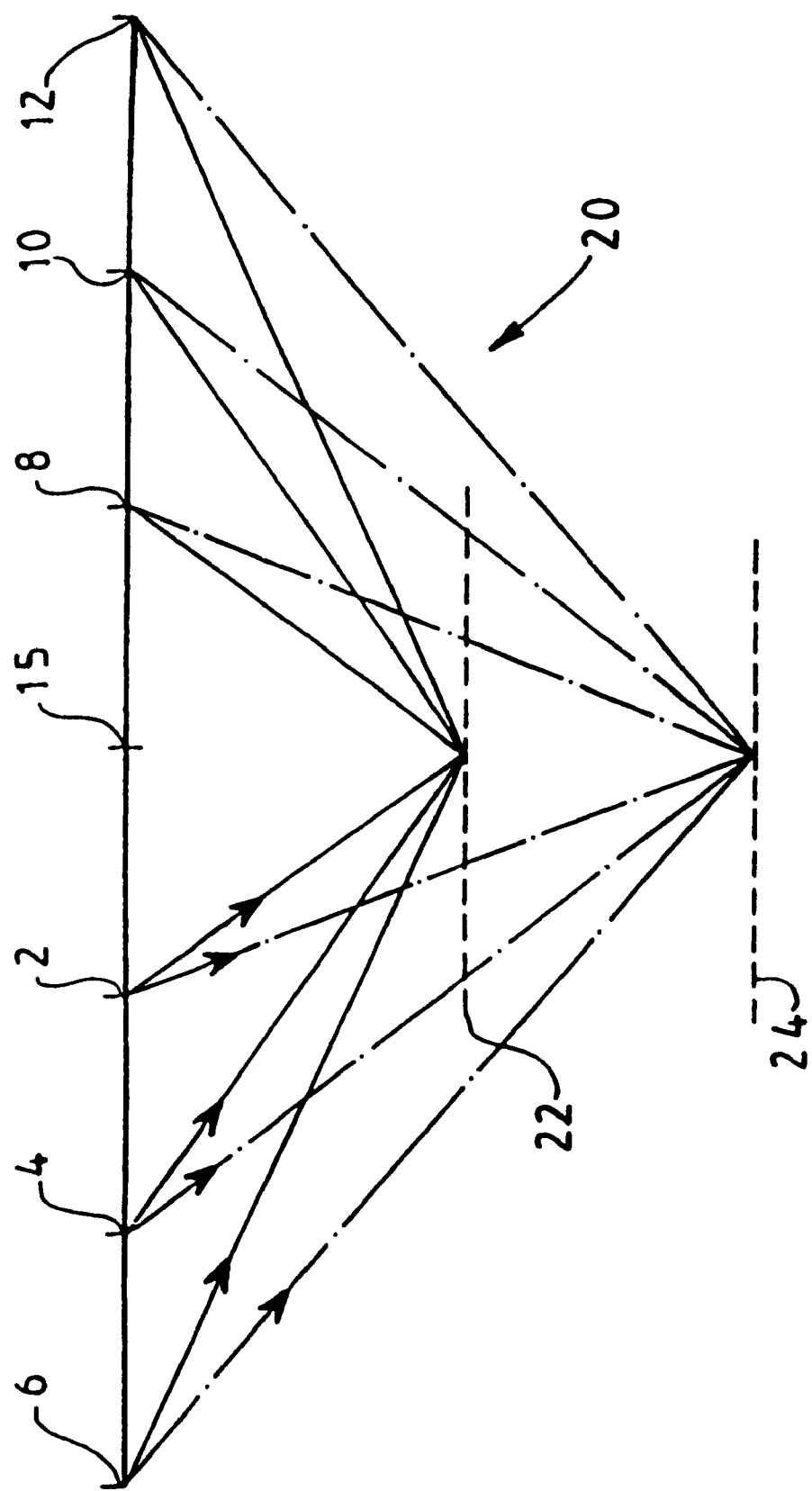
FIG. 1 is a schematic illustration of seismic signal paths to and from a common midpoint within a two dimensional seismic survey.
Figure 2:
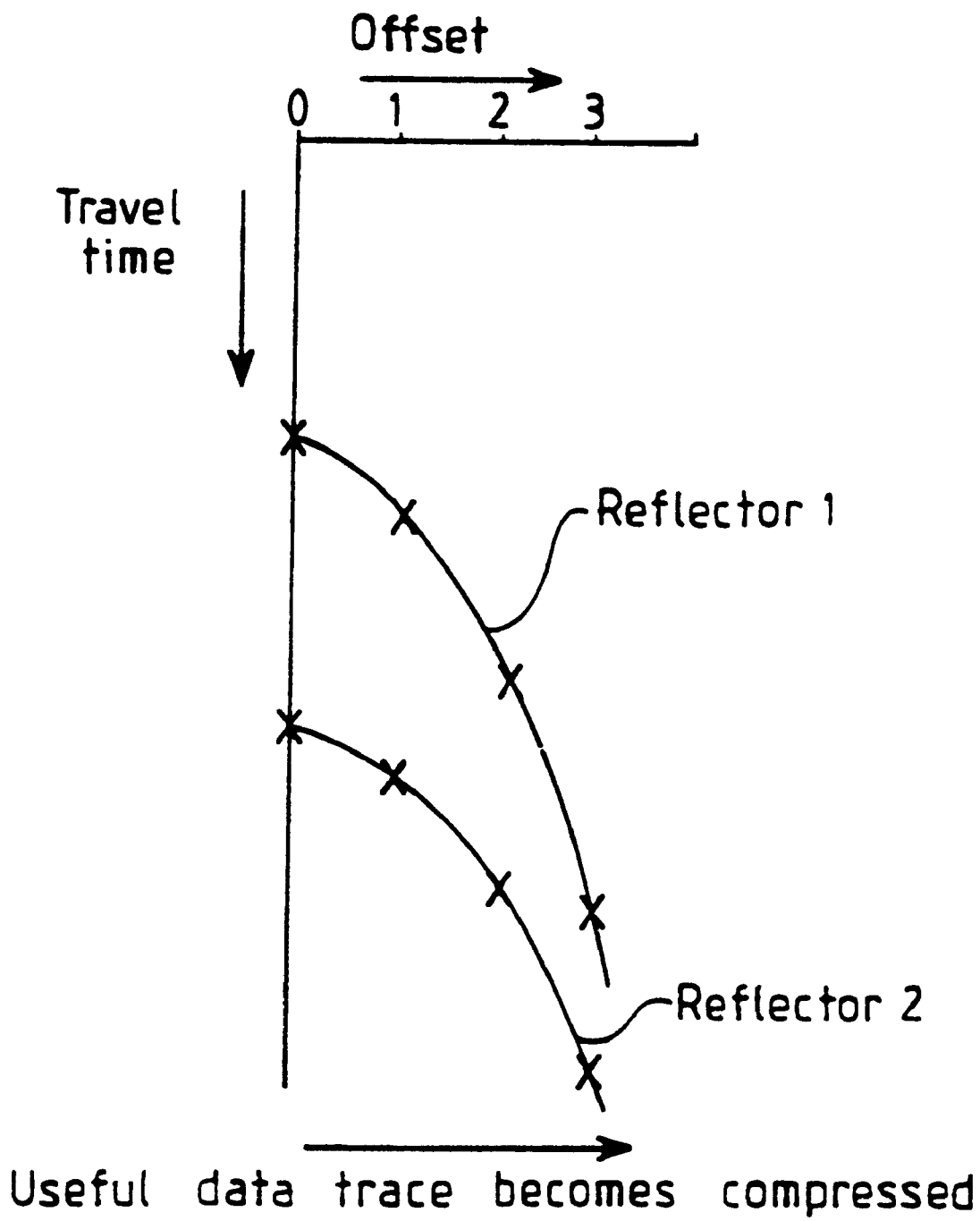
FIG. 2 illustrates the change in round trip travel time with respect to offset for seismic reflections for the arrangement shown in FIG. 1.
Figure 3:
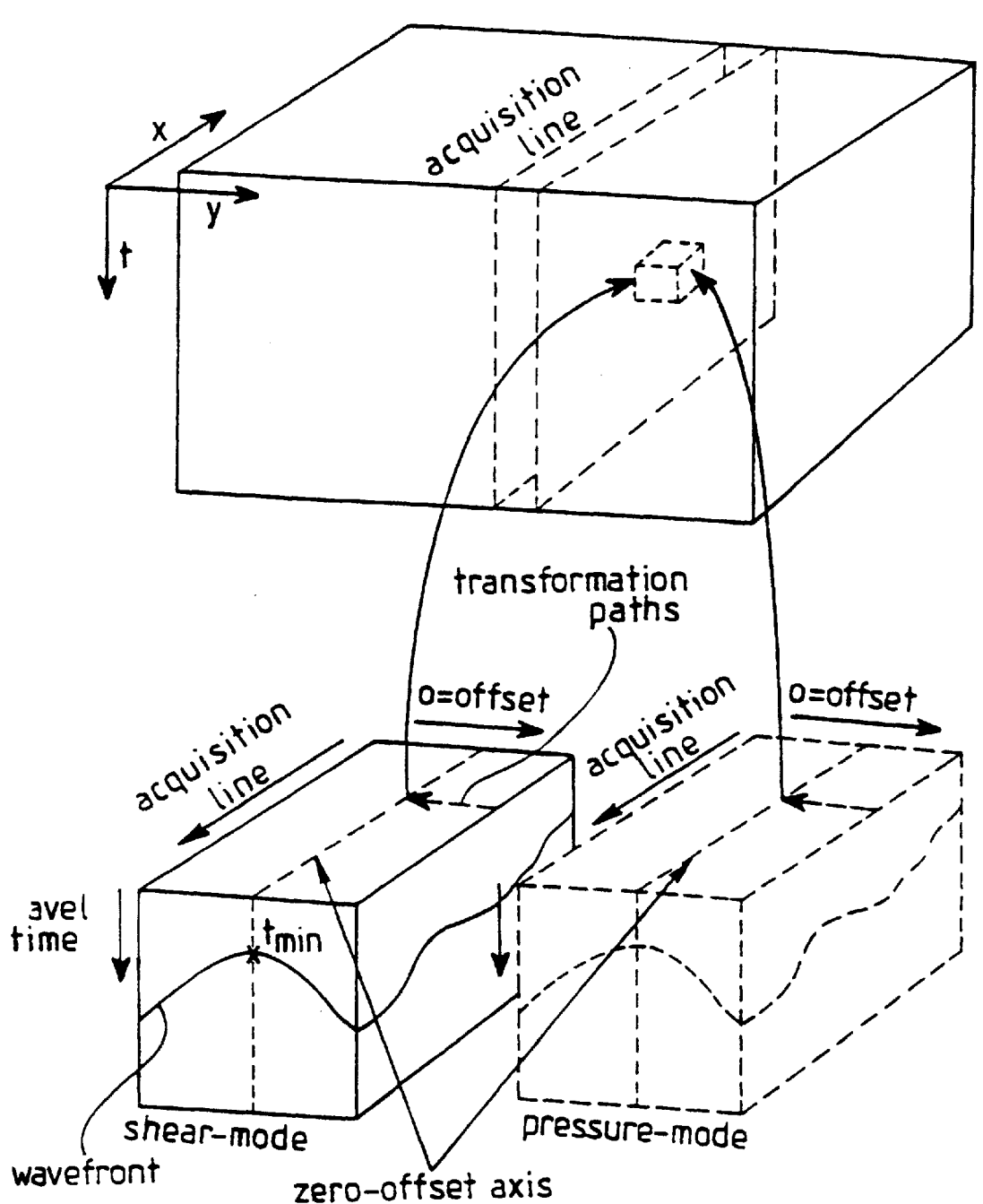
Figure 4:
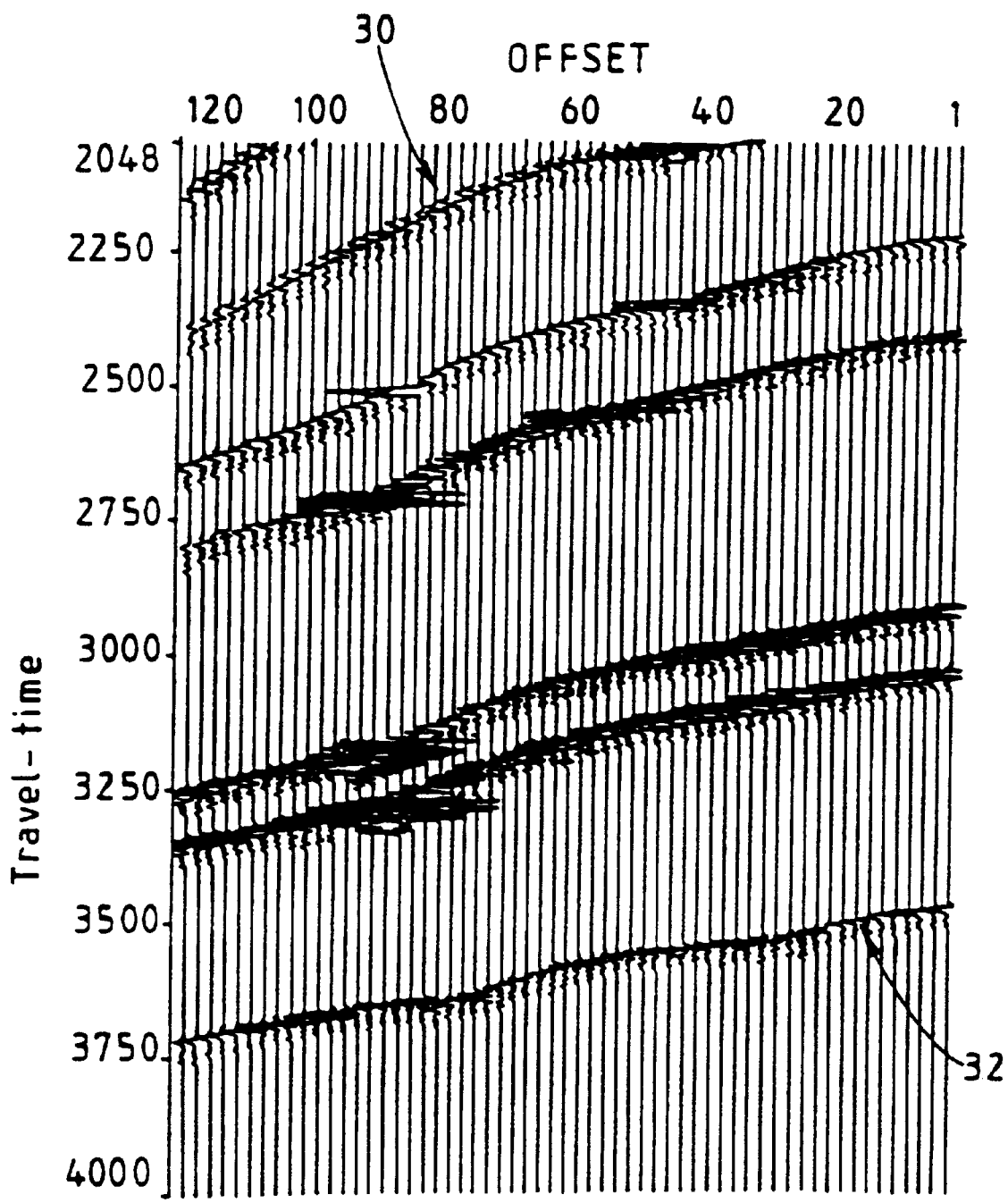
Figure 5:
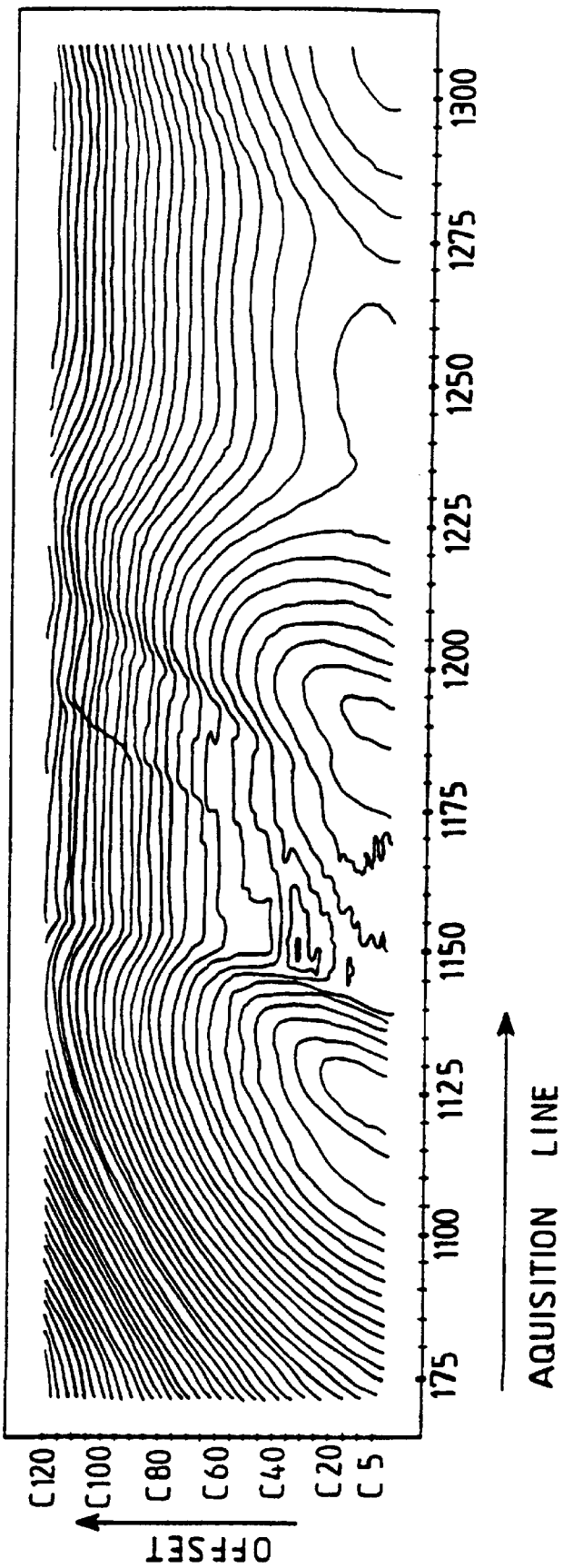

FIG. 3 schematically illustrates a four dimensional space for analysing the seismic measurements;

FIG. 4 is a schematic representation of a seismic reflection travel time curve showing the variation of travel time with respect to offset at a common midpoint gather; and FIG. 5 is a map view showing the variation in travel time with respect to offset and displacement along one dimension.

The present invention replaces the prior art stacking velocity analysis step and the hyperbolic stacking step with a travel-time extraction step and a summation step along the extracted time curves or surface. The travel-time extraction is performed continuously along acquisition lines. The travel-time curves can take any shape and do not have any hyperbolic constraints. The summation can then be performed along these general travel-time curves (or surfaces) and the average amplitudes, or any other amplitude approximations, are posted at the position where the travel-time curves intersect the zero-offset axis.

All of the available seismic data for a common midpoint may be used to develop the actual travel-time curve. The traces are examined by a computer to determine parts thereof which relate to the same reflection. The computer executes a programme that exploits the continuity of reflection amplitudes in travel-time and offset and optionally displacement (along the seismic line). A picked stack of travel-time curves relating to different travel-time depths is used to interpolate travel times to be used for the computations of the mean amplitudes that are posted to the zero offset position. The interpolation allows the processing step to account for the fact that the offsets may not be arranged in a regular array (i.e. all the offsets may not be an exact integer multiple of a unit offset). The processing does not involve the conventional normal move-out processing and thereby avoids the distortion introduced by such a technique into the traces and, as a consequence, higher frequencies at larger offsets are maintained. The interpolation may also be performed in the time domain with sub-sample accuracy. This is of benefit in extracting information from traces with large offsets because it helps to overcome the data compression which occurs with increasing offset.

The seismic measurements can be analysed in a four-dimensional space, as shown in FIG. 3. The dimensions of this space are x and y spatial coordinates of the acquisition line, an offset coordinate o, and a travel time coordinate t. The seismic data can be transformed between the four dimensional zero-ffset cube (the masterproject cube) and one or more subproject cubes having non-zero offset. Thus, the mean amplitude value over all offsets along a pre-specified curve in the subproject cube is posted at a respective position where this cube intersects the zero-offset plane $t_{min}$ and corresponding to the respective x and y spatial position along the acquisition line of the masterproject cube. The new cross-section consisting of the mean amplitude values and $t_{min}$ are generated in the master project cube along the x and y coordinates of the acquisition line. More than one subproject cube may be used, as illustrated in FIG. 3. This represents a situation where more than one wave mode is measured and is described later below.

The present invention extracts the exact travel-times explicitly from the data in the offset cube along the acquisition line and then sums along the travel line curves to get the mean amplitude at the zero-offset location. This provides improved quality of the zero-offset results.

Between the extracted wavefronts (selected by the user) new wavefronts may be interpolated. The maximum density of the interpolated wavefronts is determined by the sample rate of the zero-offset cross-section. The position of the interpolated wavefront is determined by the neighbouring extracted wavefronts. The interpolated wavefronts together with the associated amplitude values are computed for the non-zero offsets. This gives enhanced fidelity of the zero-offset transformation.

FIG. 4 schematically illustrates a series of common midpoint traces arranged in order of decreasing offset. A given feature in any trace, such as reflection 30 of trace 80 along the offset axis has a counterpart in the neighbouring traces 79 and 81. The computer is arranged to locate a given feature and its counterparts and to extract the "path" of this feature in travel time with respect to changes in offset.

In general terms, the computer is arranged to start its analysis from one or more seed points. The seed point is a user defined event on a trackable path or surface of events. This does not necessarily imply that the seed points has been manually entered into the computer. Indeed, the or each seed point may be a predetermined event that the computer has been instructed to search for (such as the first seismic signal occurring within a given travel time range for a preselected offset. The computer examines data occurring within a "neighbourhood" of the or each seed point to locate a similar seismic signal. A neighbourhood is a region of a data space (i.e. x, y coordinates, time travel, offset). The similar seismic signal may be identified using such comparison techniques as peak value identification or cross-correlation. Once a neighbouring event has been identified, it is itself used as a seed point for subsequent analysis of the data. By a repetition of the above sequence, the occurrence of a seismic reflection can be tracked through a multidimensional data space.

The search need not be done without reference to other guiding data. For example, if an earlier seismic analysis of the geology is available or an a priori surface model (velocity distribution as a function of depth) is available, this data may be used to generate travel-time data which could be used as starting points for the analysis of the acquired data or which may be used to guide the subsequent analysis of the data.

In particular, where the subsurfaces are not stratified and an a priori velocity model of the subsurfaces exists, it is possible to determine a combination of source and receiver positions which contribute to a common reflection point on the zero-offset plane. Such a technique is called trajectory stacking and can be achieved, for example, by ray tracing. Such stacking can be carried out for all source and receiver positions about the zero-offset axis.

In the case where the subsurface is stratified, the stacking trajectories correspond to a set of parallel straight lines (not shown) over the offset range of the offset cube (FIG. 3), and the common reflection point therefore coincides with the common midpoint.

The stacking trajectories can also be determined using the velocity model when the source and receiver positions deviate from a common horizontal plane (datum) by defining the source and receiver positions with respect to a corresponding common reflection point. However, the common midpoint does not coincide with the common reflection point, even if the subsurfaces are stratified.

The use of a velocity model is particularly useful when elastic waves generated by a seismic source are converted to a different mode of wave propagation, for example, the conversion at the reflecting interface of a compression wave (pressure mode) to a shear wave (shear mode). In such a case, the common reflection point does not coincide with the common midpoint, even if the subsurfaces are stratified.

The travel times have been extracted from these traces and a curve 32 has been fitted to the signals representing the deepest reflection. Curve 32 accurately matches the variation in travel time with respect to offset, which is itself a poor approximation to a hyperbolic function.

The extraction of the travel time curves can be repeated along the acquisition line in order to determine a travel time surface, as shown in FIG. 5. The black lines in FIG. 5 map out contours within the travel time surface.

It is thus possible to measure changes in travel time with increasing offset and to use these measurements within a summing process so as to provide an improved stacked trace at each common midpoint position.

We claim:

1. A method of processing seismic data traces assigned to a common reflection point, comprising
   analysing the seismic data traces to determine similar features therein relating to a reflection of seismic energy within a medium from a first reflector, and
   ordering those features with respect to at least offset so as to calculate an actual travel time surface of the seismic energy reflected from the first reflector corrected for variations in a velocity of propagation of the seismic energy.

2. A method as claimed in claim 1, in which the traces are analysed to determine travel time as a function of position of the common reflection point for seismic energy reflected from the first reflector.

3. A method as claimed in claim 1, in which the seismic traces are transformed to an equivalent zero-offset trace and the equivalent zero-offset traces are summed to form a composite trace.

4. A method as claimed in claim 1, in which similar parts of traces are identified by searching for features which vary in a substantially continuous manner with respect to changes in offset or position of the common reflection point.

5. A method as claimed in claim 1, further comprising the step of fitting a mathematically defined travel time surface as a function of at least offset to the travel time surface for the similar features of the traces identified in the analysis step.

6. A method as claimed in claim 1, further comprising the step of fitting a mathematically defined travel time curve as a function of offset to the travel time surface for the similar features of the traces defined in the analysis step.

7. A method as claimed in claim 1, in which the seismic traces are analysed to determine features therein relating to reflection from at least a second reflector, and to identify a travel time surface for reflections from the at least second reflector.

8. A method as claimed in claim 1 in which the similar features identified in the analysis step are summed.

9. A method as claimed in claims 1, in which an estimate of the geological properties of a surveyed area is used as an initial estimate in a search for features in the data traces relating to a seismic reflection.

10. A method as claimed in claim 9, in which the estimate of geological properties is used to guide the search for features in the data traces.

11. A method as claimed in claim 1, in which a velocity model is used to determine the contribution of the seismic traces to the common reflection point.

12. A method as claimed in claim 1, in which the common reflection point is a common midpoint.

13. A method for identifying a seismic energy travel time surface using a program that causes a computer to perform the steps of:
   analyzing pre-stack seismic data to select similar features therein relating to a reflection of seismic energy within a medium from a first reflector;
   identifying travel times associated with said similar features; and
   ordering said travel times with respect to offset and at least one other parameter to calculate an actual travel time surface associated with said first reflector corrected for variations in a velocity of propagation of the seismic energy.

14. A method according to claim 13, wherein said pre-stack seismic data have been sorted into an array of cells or bins prior to said analyzing step.

15. A method according to claim 13, wherein said pre-stack seismic data comprise one or more subproject cubes having non-zero offsets.

16. A method according to claim 13, wherein said at least one other parameter comprises a common reflection point position.

17. A method according to claim 16, wherein said common reflection point position is determined using a velocity model.

18. A method according to claim 13, wherein said identified travel times are associated with pressure-mode seismic energy propagation.

19. A method according to claim 13, wherein said identified travel times are associated with shear-mode seismic energy propagation.

20. A method according to claim 13, wherein said determination of similar features in said analyzing step is guided by estimates of the geology of the region.

21. A method according to claim 13, wherein said determination of similar features in said analyzing step is guided by preexisting survey data.

22. A method according to claim 13, wherein said similar features are determined using a seed point having a seed point location and in which seismic data occurring within a neighborhood of said seed point location are examined to locate similar seismic signals.

23. A method according to claim 22, wherein said similar seismic signals are located using a comparison technique.

24. A method according to claim 23, wherein said comparison technique comprises cross-correlation.

25. A method according to claim 13, further comprising the step of displaying said travel time surface.

26. A method of processing pre-stack seismic data comprising the steps of:
   sorting pre-stack seismic data into any array of cells;
   selecting similar features within pe-stack seismic data that relate to a reflection of seismic energy within a medium from a first reflector using one or more seed points having seed point locations, said selecting step examining seismic data occurring within a neighborhood of said seed point locations to locate similar seismic signals using a comparison technique;
   identifying travel times associated with said selected similar features;
   ordering said travel times with respect to offset and common reflection point position to calculate an actual travel time surface associated with said first reflector corrected for variations in a velocity of propagation of the seismic energy; and
   displaying said travel time surface.

\* \* \* \* \*